US011601941B2

(12) United States Patent
Ambeskar et al.

(10) Patent No.: US 11,601,941 B2
(45) Date of Patent: Mar. 7, 2023

(54) METHOD FOR EFFICIENT RETURN CHANNEL SPECTRUM UTILIZATION IN A COMMUNICATION SYSTEM SUPPORTING ADAPTIVE SPREAD SPECTRUM

(71) Applicant: HUGHES NETWORK SYSTEMS, LLC, Germantown, MD (US)

(72) Inventors: Nimesh P. Ambeskar, Germantown, MD (US); Aniket Pugaonkar, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 102 days.

(21) Appl. No.: 17/139,992

(22) Filed: Dec. 31, 2020

(65) Prior Publication Data
US 2022/0210787 A1 Jun. 30, 2022

(51) Int. Cl.
H04W 16/10 (2009.01)
H04W 72/0453 (2023.01)
H04W 72/04 (2023.01)
H04B 7/26 (2006.01)
H04L 5/00 (2006.01)

(52) U.S. Cl.
CPC ...... *H04W 72/0453* (2013.01); *H04B 7/2656* (2013.01); *H04L 5/0055* (2013.01); *H04W 16/10* (2013.01); *H04W 72/0493* (2013.01)

(58) Field of Classification Search
CPC ............. H04W 72/0453; H04W 16/10; H04W 72/0493; H04B 7/2656; H04L 5/0055
See application file for complete search history.

(56) References Cited

U.S. PATENT DOCUMENTS

| 6,631,124 | B1* | 10/2003 | Koorapaty | H04W 72/08 370/335 |
| 8,036,225 | B1* | 10/2011 | Pawar | H04W 74/008 370/395.42 |
| 2002/0097740 | A1 | 7/2002 | Choi et al. | |
| 2004/0114574 | A1 | 6/2004 | Zeira et al. | |
| 2005/0030932 | A1* | 2/2005 | Kelly | H04B 7/2125 370/321 |
| 2005/0094604 | A1 | 5/2005 | Ozluturk et al. | |
| 2008/0304828 | A1* | 12/2008 | Mizutani | H04Q 11/0067 398/78 |
| 2011/0197239 | A1 | 8/2011 | Schlack | |

(Continued)

OTHER PUBLICATIONS

International Search Report and Written Opinion issued in Application No. PCT/US2021/065500, dated Mar. 24, 2022.

(Continued)

*Primary Examiner* — Edan Orgad
*Assistant Examiner* — Malick A Sohrab
(74) *Attorney, Agent, or Firm* — Potomac Technology Law, LLC

(57) ABSTRACT

An efficient return channel spectrum utilization technique for communication systems supporting adaptive spread spectrum. Requests for bandwidth allocation using a spread factor are analyzed to determine if there are any channels capable of supporting the spread factor. The request is acknowledged if at least one channel is capable of supporting the request. Adjacent channels required to accommodate the requested spread factor are reserved, and additional bandwidth requests are allocated on non-reserved channels.

18 Claims, 9 Drawing Sheets

(56) References Cited

U.S. PATENT DOCUMENTS

2016/0254889 A1* 9/2016 Shattil .................. H04B 7/0452
370/329
2017/0288726 A1 10/2017 Kaddoum et al.
2018/0343587 A1* 11/2018 Condeixa .............. H04W 4/027
2019/0132831 A1* 5/2019 Stauffer .............. H04W 72/042

OTHER PUBLICATIONS

Ghani et al., "Spread spectrum based energy efficient collaborative communication in wireless sensor networks", PloS one 11.7 (2016).

* cited by examiner

Spread Factor

| | 2X | 4X | 8X |
|---|---|---|---|
| F1 | UNAVAILABLE | UNAVAILABLE | UNAVAILABLE |
| F2 | (F1, F3) | UNAVAILABLE | UNAVAILABLE |
| F3 | (F2, F4) | (F2, F4), (F1, F5) | UNAVAILABLE |
| F4 | (F3, F5) | (F3, F5), (F2, F6) | UNAVAILABLE |
| F5 | (F4, F6) | (F4, F6), (F3, F7) | (F4, F6), (F3, F7), (F2, F8), (F1, F9) |
| F6 | (F5, F7) | (F5, F7), (F4, F8) | (F5, F7), (F4, F8), (F3, F9), (F2, F10) |
| F7 | (F6, F8) | (F6, F8), (F5, F9) | UNAVAILABLE |
| F8 | (F7, F9) | (F7, F9), (F6, F10) | UNAVAILABLE |
| F9 | (F8, F10) | UNAVAILABLE | UNAVAILABLE |
| F10 | UNAVAILABLE | UNAVAILABLE | UNAVAILABLE |

Frequency

Fig. 4

METHOD FOR EFFICIENT RETURN CHANNEL SPECTRUM UTILIZATION IN A COMMUNICATION SYSTEM SUPPORTING ADAPTIVE SPREAD SPECTRUM

BACKGROUND INFORMATION

Time Division Multiple Access (or TDMA) is a technology that is commonly used in wireless communication such as cellular and satellite communication networks. TDMA allows multiple terminals, such as very small aperture terminals (VSATs) in a satellite network, to transmit intermittently at the same frequency. This allows for shared access to the medium (in this case a frequency channel) by dividing the signal into different time slots and instructing the terminals to transmit at different time intervals. A unit of time can be divided, for example, into multiple frames of fixed time duration. Each frame is further divided into integer number of slots. A terminal may create a burst that is sent over multiple continuous slots. Accordingly, bursts transmitted by the terminals do not overlay when they arrive at the receiver in the gateway, base station, etc. The gateway can subsequently demodulate the signals as they arrive in sequence.

Spread Spectrum is a technique in which a signal of a given bandwidth is spread over a wider bandwidth for transmission based on a spread factor. The transmitter (e.g., within the terminal) deliberately spreads the signal in frequency domain resulting in wider bandwidth, while the receiver (e.g., within the gateway) receives that signal of wider bandwidth and de-spreads it to original bandwidth. Different spread levels include, for example, spread-1 (no spread), spread-2 (×2 spread), spread-4 (×4 spread), and spread-8 (×8 spread).

In an adaptive spread spectrum system, a specific channel is configured with the maximum (or worst case) spread factor that the terminal might use. The spread (or spreading) factor can be changed from one allocation to another on different terminals on burst by burst basis. Adaptive spreading thus enables multiple user terminals to share the same channel capacities with different spread-modes (or spread factors). The receiver can dynamically de-spread different spread factors in the frequency channel configured for spreading. Based on the worst case spread factor required for transmission, the channel frequencies need to be sized and spaced carefully to avoid adjacent channel interference.

Satellite spectrum, for example, is divided into different operating frequencies based on operating symbol rates. Channel spacing refers to how close together the center frequencies of two adjacent channels can be. The closer the channels are to each other, the less spectrum they occupy. However, the closer they are the more they interfere with each other. This is referred to as Adjacent Channel Interference (or ACI). To avoid ACI, the channels are spaced with enough guard bandwidth of a few kilohertz.

A remote terminal may need spreading only in certain situations to avoid interference with other beams in mobility networks. This technique allows the reception of a signal with relatively lower power as compared with a no-spread signal thereby keeping PSD (Power Spectral Density) requirements for satellite transmissions within required limits. Typically, constant spread spectrum techniques are used where the signal is spread into a wider bandwidth based on fixed spread factor in use. For example, spreading by a factor of two (2) converts N kilosymbols per second (ksps) into N*2 kilochips per second (kcps). The spread transmission now occupies twice as much spectrum but only requires the amount of power needed for the original transmission. This results in reducing the transmit Power Spectral Density (PSD). If the current spread factor is less than the maximum spread factor for the channel, however, the remaining bandwidth is unused, thus reducing spectral efficiency.

Systems such as satellite networks can also be subject to PSD regulatory constraints set by local and/or regional jurisdictions. With fixed antennas, system planning (e.g. the link budget) generally takes care of making sure PSD limits are not exceeded without the use of spreading. Mobile and aero terminal antennas, however, operate under changing conditions. Limiting the transmit power of such terminals to the worst case all of the time can significantly impact performance, particularly because the worst-case conditions are generally infrequent.

One of the drawbacks in adaptive spread spectrum is the potential for wasted bandwidth. More particularly, if overall utilization of the frequency channel being used of spreading is very low, or even zero, the allocated spectrum for that channel remains statically widened based on maximum spread-mode supported. Thus, the additional bandwidth allocated for spreading is wasted. Additional bandwidth can be wasted when a large frequency domain has been allocated based on a high maximum spread factor (e.g., ×8, ×16, ×32, etc.).

BRIEF SUMMARY

An apparatus and method are disclosed for efficiently utilizing return channel spectrum in a communication system supporting adaptive spread spectrum. According to an embodiment, the apparatus includes: a transceiver for transmitting and receiving information; and one or more processors configured to: receive a request, from a terminal, for bandwidth allocation using a requested spread factor; determine if any channels are currently capable of supporting the requested spread factor; reject the request if no channels are currently capable of supporting the request; generate an acknowledgement for transmission to the terminal if at least one channel is capable of supporting the request; reserve two or more channels adjacent to a selected channel from the at least one channel based, at least in part, on the requested spread factor; and allocate bandwidth for data received from other terminals on non-reserved channels.

According to another embodiment, the method includes: receiving a request, from a terminal, for bandwidth allocation using a requested spread factor; determining if any channels are currently capable of supporting the requested spread factor; rejecting the request if no channels are currently capable of supporting the request; transmitting an acknowledgement to the terminal if at least one channel is capable of supporting the request; reserving two or more channels adjacent to a selected channel from the at least one channel based, at least in part, on the requested spread factor; and allocating bandwidth for data received from other terminals on non-reserved channels.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 illustrates an exemplary spread factor table, according to least one embodiment;

DETAILED DESCRIPTION

An apparatus and method for efficiently utilizing return channel spectrum in a communication system supporting adaptive spread spectrum, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
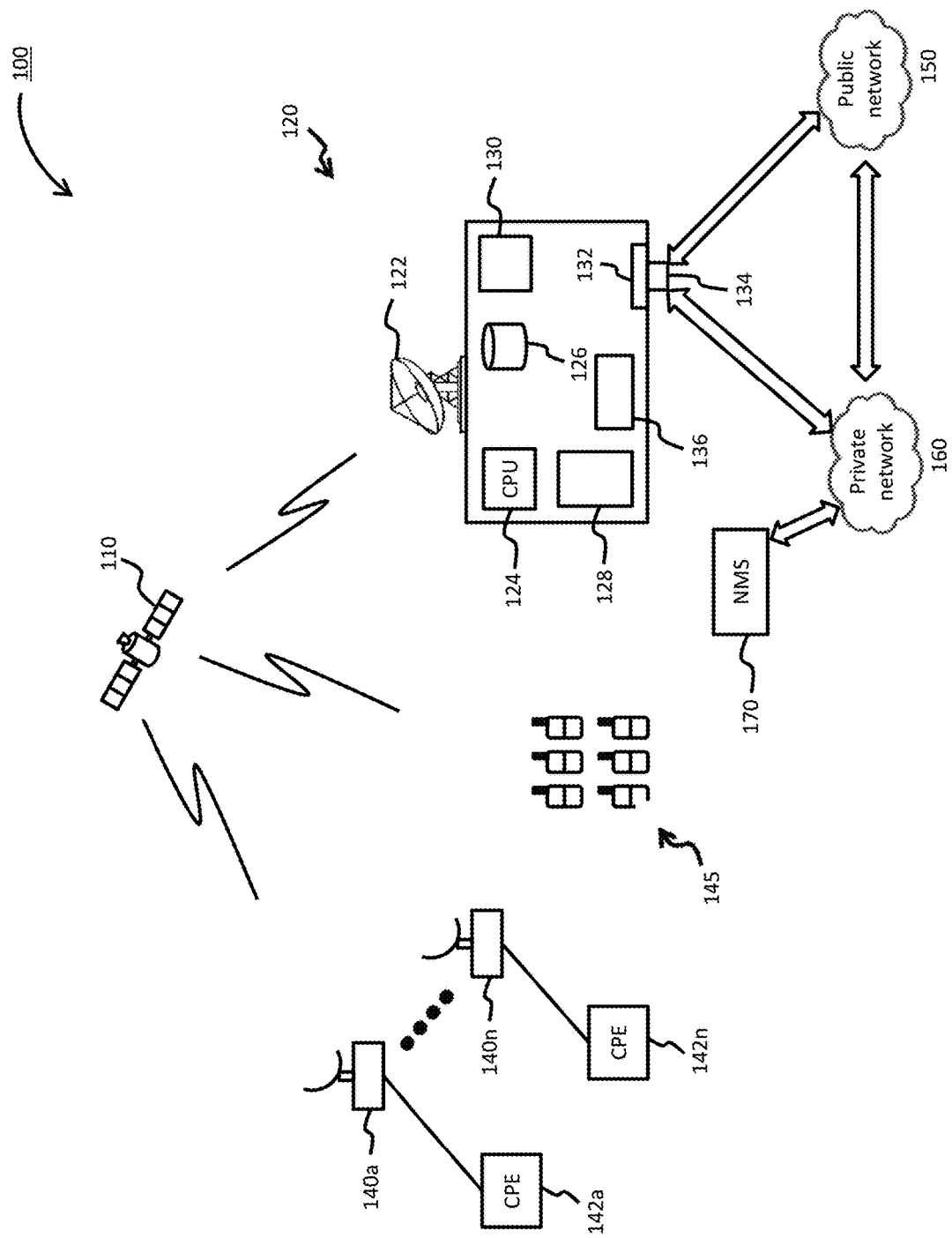
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized. The gateway 120 further includes a bandwidth allocator 136 which allocates bandwidth to the terminals 140. As further discussed below, the bandwidth allocator 136 can dynamically allocate different spread factors for different channels (or frequencies) based on various factors.

Figure 2:
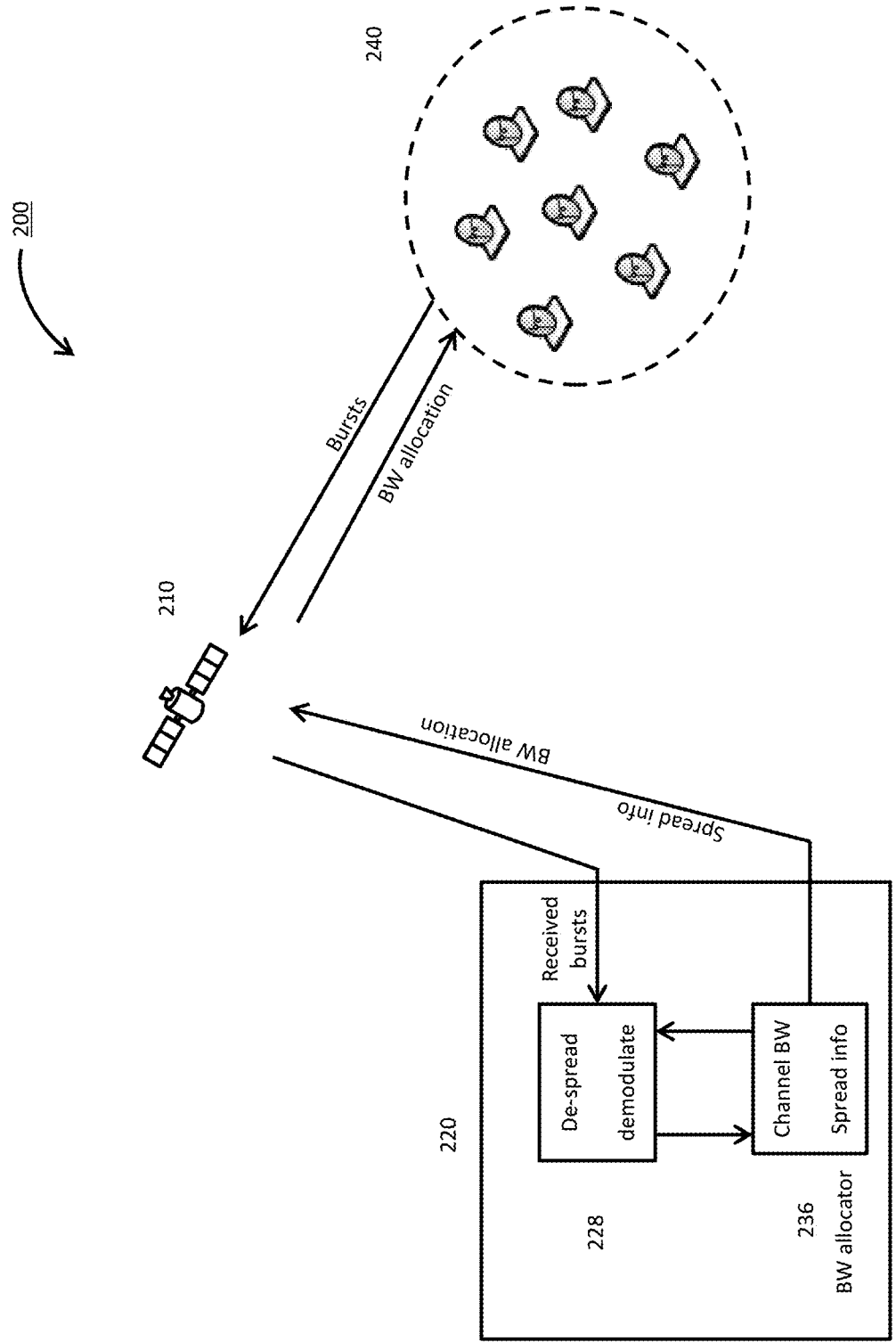
FIG. 2 is a diagram of components used to allocate bandwidth in the system of FIG. 1, according to one or more embodiments.

FIG. 2 a block diagram of components used in a system 200 to allocate bandwidth, in accordance with one or more embodiments. The system 200 includes a satellite 210, a gateway 220, and various terminals. It should be noted that various components have been omitted from the system 200 in order to avoid obscuring the features described herein. The gateway 220 includes a demodulator 228, which can be a part of the baseband components 128 shown in FIG. 1. The gateway 220 further includes a bandwidth allocator 236 similar to the bandwidth allocator 136 shown in FIG. 1.

According to the illustrated embodiment, the bandwidth allocator 236 is configured to process bandwidth allocation requests received from the terminals 240 via the satellite 210. For example, prior to transmitting data over the satellite communication system, the terminals 240 submitted a request for bandwidth that can be used to transmit the data. According to various embodiments, the request received from the terminals 240 can also incorporate a desired spreading factor. Upon receiving the request, the bandwidth allocator 236 examines the available frequency spectrum in order to identify channels (or frequency bands) capable of supporting the particular spread factor included in the request from the terminal 240.

According to various embodiments, the bandwidth allocator 236 is capable of identifying the position of each channel within the frequency spectrum and utilizing one or more adjacent channels to accommodate the spreading factor. For example, a request for 2× spread would require 2 adjacent channels, one above and one below, the primary channel being used to transmit the data. Similarly, a 4× spread factor would require four adjacent channels, two above and two below the primary channel. As can be appreciated, the amount of spreading that can be accommodated by a particular channel depends on its location within the frequency spectrum. For example, the first channel and the last channel in the frequency spectrum cannot accommodate any spreading because channels are only available on one side, e.g., below the first channel and above the last channel. The second channel and the penultimate channel would be capable of accommodating a 2× spread factor at most, because only one channel is capable of being selected from either side. Upon determining which channels are capable of accommodating the bandwidth request, the bandwidth allocator 236 provides an acknowledgment to the terminal 240 to indicate that the spread factor is available, as well as the channel that should be used to transmit the data.

As the bandwidth allocator 236 continues to receive request for bandwidth from other terminals 240, it reserves time (or TDMA slot allocations) on channels adjacent to the channel assigned to the first terminal 240 so that they become unavailable for assignment to any remaining terminals 240 at those time (slots). Bandwidth can be allocated to the terminals 240 on a burst by burst basis in the frequency domain and arranged slot by slot on a particular TDMA frame in the time domain. Furthermore, if the first terminal 240 requires multiple bursts with the requested spread factor, the bandwidth allocator 236 would reserve the adjacent channels for the required number of bursts/time slots as well. These adjacent channels would also be unavailable for use by any other terminals 240 at the reserved time slots.

As used herein, "reserved channels" correspond to the channels adjacent to a channel assigned with a particular spread factor. Such channels are only reserved for the time/slots designated by the bandwidth allocator 236 on a TDMA frame or frame. Furthermore, the bandwidth allocator 236 does not assign these channels to other terminals 240 during the reserved time/slots. If the bandwidth allocator 236 allocates three slots for a terminal's requested spread factor, for example, the channels reserved for spreading the signal would be reserved and unavailable for assignment to other terminals over the entire three slot/time period. After the allocated slot/period, however, these channels can be allocated to other terminals requesting bandwidth with or without spreading. This is used interchangeably with the "no allocation" designation for channels during certain time/slots. It should be noted, however, that the other channels that are not reserved for the same assigned slots are available for use by other terminals 240. For example, if a frequency spectrum contains nine channels (i.e., f1-f9), and a terminal receives bandwidth allocation with 2× spread for a single slot, then the remaining six channels can be assigned to other terminals with or without spreading for the same slot. All nine channels would be available for the next slot.

According to at least one embodiment, the bandwidth allocator 236 supplies a bandwidth allocation packet to all terminals 240 transmitting on the current TDMA frame. The bandwidth allocation packet can include, for example, the channel number, the terminal ID assigned to the channel, the frame number, burst size, spread mode, etc. Once the terminals 240 transmit their bursts via the satellite 210, they are received at the gateway 220 and supplied to the demodulator 228. According to various embodiments, the bandwidth allocator 236 also supplies information to the demodulator 228 to facilitate processing of burst received from the terminals 240. For example, the bandwidth allocator 236 can supply a burst plan to the demodulator 228 in order to identify each channel number, the burst size associated with the channel, the burst duration, the spread mode being used, etc. The demodulator 228 utilizes this information to detect, de-spread, and demodulate the received bursts and demodulator 228 them so that they are properly processed and supplied to the destination.

Depending on the manner in which the frequency bands are divided within the frequency spectrum, the bandwidth allocator 236 can be configured to identify adjacent channels that are usable for spreading in different manners. For example, if the system allocates the same amount of bandwidth to each channel, adjacent channels necessary for accommodating a particular spread factor remains constant and are substantially based on the location of the primary channel and channel spacing factor used in the specific implementation. If the bandwidth is independently allocated for each channel, then some or all of the channels may have different bandwidth sizes, although the channel spacing factor would remain constant. According to one or more embodiments, the bandwidth allocator 236 can be configured to determine the channel size prior to identifying channels that may be capable of accommodating a received spread request.

Figure 3:
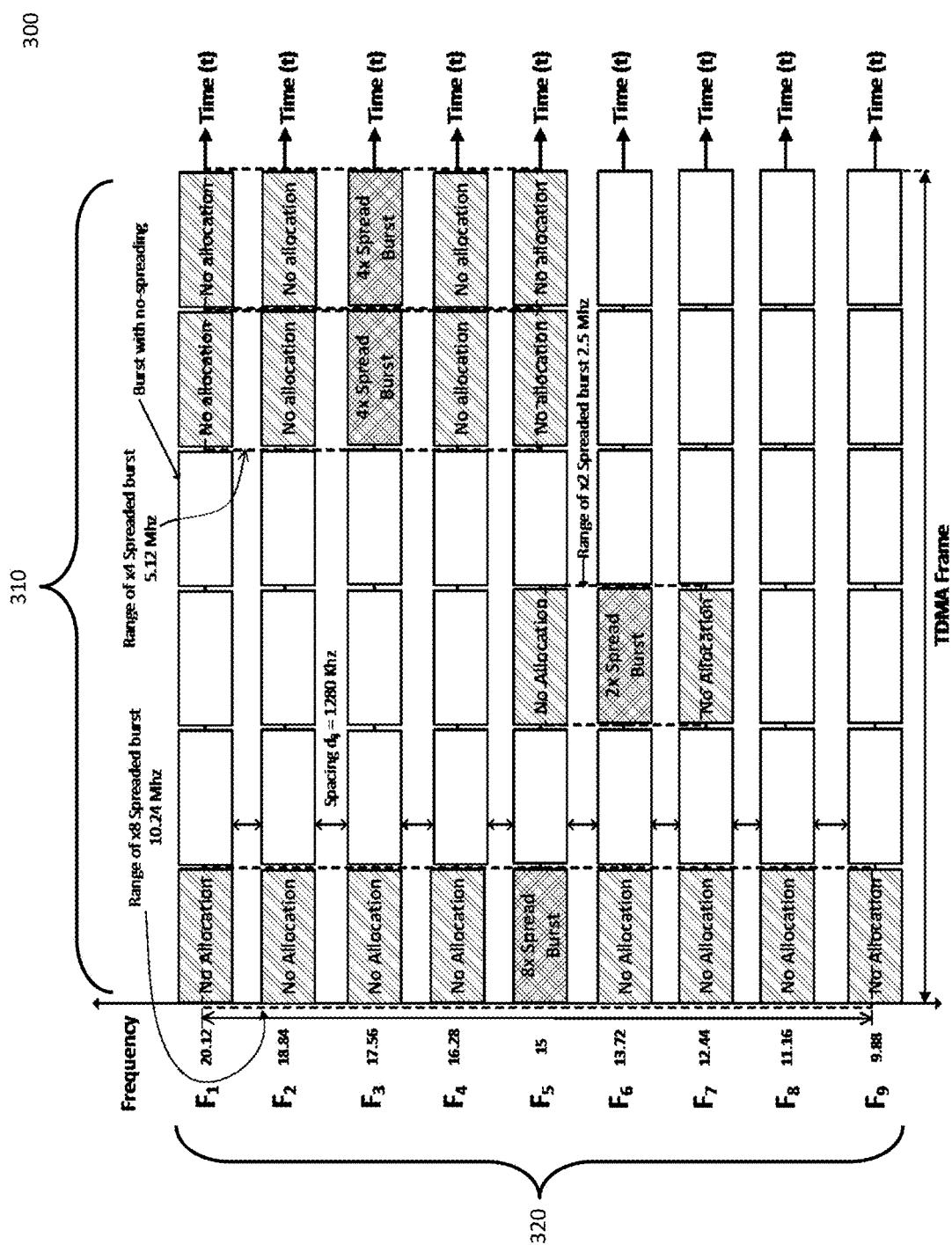
FIG. 3 is a diagram of a TDMA frame used in various embodiments.

Referring additionally to FIG. 3, an exemplary TDMA frame 300 is shown. The TDMA frame 300 contains a plurality of slots 310 that can be used to transmit data received from different terminals 240. According to the illustrated embodiment, the frequency spectrum is divided into 9 channels 320 (F1-F9). For purposes of illustration, the channels have been assigned the same carriers and bandwidth. Each carrier is configured to have a 1 Msps (1 Mega symbol per second) bandwidth with frequencies F1-F9, where $$1\ Msps = 1024 Ksps = 1.024*10^6\ \text{symbols per second}$$

Operating at offset quadrature phase-shift keying (OQPSK) modulation type where each symbol can be used to encode 2 bits of digital data. The bandwidth of each carrier is 1 MHz. The overall raw bit rate (throughput) achieved for each carrier is given by:

$$T_{raw} = $$
$$(\text{Bits/Symbol})*\text{Symbol rate} = 2\ \text{bits/sec} * 1\ Msps = 2\ Mbps.$$

For nine carriers, the aggregate throughput that could be achieved is 2*9=18 Mbps. Consider a system implementation, for example, where spacing between center frequencies (or channel) is selected to be 1.25×, $d_{12}$ denotes the gap between the edges of F1 and F2, and $d_{23}$ denotes the gap between the edges of F2 and F3. Using formula for spacing, $d_{12}$ and $d_{23}$ would be equal (because the channels have the same bandwidth) and can be calculated as, $$d = 1/2*(1.024*1.25) + \frac{1}{2}*(1.024*1.25) = 1.28\ \text{MHz}.$$

Table 1 shows a breakdown for a frequency spectrum with 9 channels (F1-F9) of 1 Msps bandwidth and no-spread spacing of 1.25×.

TABLE 1

| Frequency | Bandwidth (Ksps) | Center Freq (MHz) | Lower Edge (MHz) | Upper Edge (MHz) |
| --- | --- | --- | --- | --- |
| F1 | 1024 | 20.12 | 19.608 | 20.632 |
| F2 | 1024 | 18.84 | 18.328 | 19.352 |
| F3 | 1024 | 17.56 | 17.048 | 18.072 |
| F4 | 1024 | 16.28 | 15.768 | 16.792 |
| F5 | 1024 | 15 | 14.488 | 15.512 |
| F6 | 1024 | 13.72 | 13.208 | 14.232 |
| F7 | 1024 | 12.44 | 11.928 | 12.952 |
| F8 | 1024 | 11.16 | 10.648 | 11.672 |
| F9 | 1024 | 9.88 | 9.368 | 10.392 |

Referring to Table 1, the center frequencies are calculated based on 1.25× spacing. The total bandwidth using 1.25× spacing is calculated as:

$$B_{total} = \text{Symbol rate} * \text{spacing factor} * \text{total channels} =$$
$$1.024*1.25*9 = 11.52\ \text{MHz}.$$

According to the embodiment illustrated in FIG. 3, the bandwidth allocator 236 has allocated an 8× spread burst to a first terminal 240 on the first slot of TDMA frame 300. The burst is allocated on channel F5 (or primary channel). Under normal circumstances, the burst would interfere with adjacent channels having allocations on the same slot of the TDMA frame 300. According to various embodiments, the bandwidth allocator 236 is configured to calculate the maximum spread on either side of the center frequency of channel F5 plus the additional spacing (d) between two channels. The bandwidth allocator 236 will perceive the 8× spread burst with a bandwidth of 8 Msps, calculate the spacing required between an 8 Msps and 1 Msps channel and find the edge of the spectrum from the center. If $S_{8x}$ is the distance calculated from the center of channel F5 to one of the edges of the spectrum. Then S is calculated as $$S_{8x} = \left(\frac{1}{2}*8 Msps*1.25\right) = 5.12\ \text{MHz}$$

Hence the start and end edges (including spacing) for the 8× spread burst will be 20.12-9.88 with a total bandwidth spectrum of 10.24 MHz.

Adjacent frequencies that do not overlap are marked as available for bandwidth allocation for that burst duration (i.e., slot on the TDMA frame). In other words, the bandwidth allocator 236 reserves four adjacent channels (F1-F4) above channel F5 and four adjacent channels (F6-F9) below channel F5. The second slot of the TDMA frame 300 contains 9 bursts from different terminals 240 without any spreading. Such bursts are also considered 1× spread burst because they do not require the use of adjacent channels. Thus the entire frequency spectrum was utilized by a terminal 240 for transmitting an 8× spread burst on channel F5 for slot 1, channels (F1-F4) and (F6-F9) are reserved and not available for use by other terminals 240 for that slot interval. Thus, the channel reservation for adaptive spreading can be dynamically changed depending on the required bandwidth for each terminal. This is entirely different from conventional systems that would permanently allocate the maximum spreading factor to the channel. For example, in a conventional system, if Channel F5 is to support maximum spreading of 8×, then channels F1-F4 and F6-F9 would have to be spaced far from F5 based on 8× spacing, thereby increasing the total bandwidth needed for all the channels. If a terminal transmitting on the TDMA frame on frequency F5 does not require any spread-mode burst, it results in underutilization of spectrum carved out for F5.

The bandwidth allocator 236 subsequently utilizes the third slot of the TDMA frame 300 to accommodate bursts without spreading to four different terminals 240 on channels F1-F4, F8, and F9. Channels F5 and F7, however, are reserved to accommodate a 2× spread burst on channel F6 from a different terminal. The distance S2x as calculated from the center of channel F6 (i.e., 13.72 MHz) will be (½*2 Msps*1.25)=1.25 MHz. The start and end edges of the burst (including spacing) will be 12.47 and 14.97, with a total bandwidth of 2.5 MHz. The fourth slot of the TDMA frame 300 is used to carry bursts without spread from 9 different terminals 240.

FIG. 3 also illustrates a 2-burst request (or back-to-back bursts) that has been allocated with 4× spreading to a particular terminal 240 on slots 5 and 6 of the TDMA frame 300. Such a situation can occur, for example, when the bandwidth allocator 236 determines that the amount of data associated with a particular bandwidth allocation request cannot be accommodated using a single burst. Thus, back-to-back bursts are allocated to the terminal 240 using the requested spread factor. Depending on the specific amount of data being transmitted, the number of bursts staggered back-to-back on the TDMA frame can also be increased. Since back-to-back burst are required to accommodate data for the bandwidth allocation request, the bandwidth allocator 236 reserves adjacent channels on consecutive slots of the TDMA frame 300. The terminal 240 would, therefore, be instructed to transmit two consecutive bursts on channel F3 using the requested spread factor. The bandwidth allocator 236 would also reserve channels F1, F2, F4, and F5 for two slots in order to accommodate back-to-back bursts from the terminal 240 with a 4× spread.

Furthermore, the bandwidth allocator 236 assigns bursts without spreading on channels F6-F9 onto the fifth and sixth slots of the TDMA frame 300. Thus, the bandwidth allocator 236 is capable of dynamically accommodating different spread factors to different channels on a per burst basis. Furthermore, adjacent channels that are not utilized to accommodate a requested spread factor on a particular slot can be used by other terminals 240 to transmit burst with spreading, bursts without spreading, or both. For example, the bandwidth allocator 236 can assign a 2× spread burst to a different terminal 240 on channel F7 using slot five of the TDMA frame 300. A normal burst (no spread) from a different terminal 240 could further be assigned to channel F9 in slot 5. Another 2× spread burst can be allocated to a different terminal 240 on channel F8 in slot 6 of the TDMA frame 300. This would leave channel F6 available for a normal burst (without spreading) from a different terminal 240.

When the gateway 220 receives the TDMA frame 300, the demodulator 228 utilizes the burst plan information received from the bandwidth allocator 236 in order to properly process the TDMA frame 300. More particularly, the demodulator 228 utilizes information contained in the burst plan regarding bursts from each terminal 240 to determine which slots on the TDMA frame 300 are carrying bursts with spreading as well as the spread factor. This allows the demodulator 228 to de-spread the signal corresponding to each slot of the TDMA frame 300 to its original bandwidth prior to demodulation. The demodulator 228 (and other gateway components) can perform appropriate processing of the data from the TDMA frame 300 so that it may be supplied to external networks.

FIG. 4 illustrates an exemplary spread factor table 400 that can be generated, in accordance with at least one embodiment. As previously discussed, the manner in which the bandwidth allocator 236 determines the spread factor that can be accommodated on a particular channel can vary based on the bandwidth associated with each channel in the frequency spectrum. If the channels have the same bandwidth, the amount of spread that any channel can accommodate will be based on its location in the frequency spectrum. According to an embodiment, the bandwidth allocator 236 can be configured to generate a spread factor table 400 which specifies the spread factor available to each channel as well as the adjacent channels necessary to facilitate the particular spread factor. The exemplary spread factor table 400 corresponds to a frequency spectrum that has been divided into 10 channels, namely F1-F10. The spread factor table 400 also illustrates the specific spread factors supported by the system, namely 2×, 4×, and 8×. Although three spread factors are shown in FIG. 4, it should be noted that different systems can be configured to support additional spread factors depending on the specific configurations.

According to the illustrated embodiment, channels F1 and F10 cannot accommodate any of the available spread factors. Channels F2 and F9 are only capable of accommodating 2× spread factor. Accordingly, the bandwidth allocator 236 determines the tuple of channels that would be used to accommodate a 2× spread on channel F2. Specifically, channel F1 (above) and channel F3 (below) would be utilized to accommodate a 2× spread on channel F2. Likewise, channels F8 and F10 would be utilized to accommodate a 2× spread on channel F9. As indicated in the spread factor table, channels F2 and F9 cannot accommodate a 4× spread or an 8× spread. Channels F3 and F8 are each capable of accommodating a 2× spread and a 4× spread. An 8× spread would not be available for these two channels. The spread factor table 400, therefore, contains the tuple of adjacent channels that would be used to accommodate the 2× spread on channels F3 and F8 in the 2× column. The table also shows the tuples of adjacent channels that would be used to accommodate a 4× spread in the 4× column. For example, channel F3 can accommodate a 4× spread by utilizing adjacent channels F2 (above) and F4 (below), and F1 (above) and F5 (below).

As illustrated in FIG. 4, channels F4 and F7 are also capable of accommodating 2× spread and 4× spread. These two channels, however, cannot accommodate a wider spread (8× or more) due to their location in the frequency spectrum. Specifically, only three adjacent channels are available above channel F4, and only three adjacent frequency channels are available below channel F7. Despite having additional channels available on the opposite sides, the amount of spreading is limited to the lowest number of adjacent channels on either side of the selected channel. Due to their locations in the middle of the frequency spectrum, however, channels F5 and F6 are capable of accommodating all three of the available spread factors (2×, 4×, 8×). Thus, each corresponding column specifies the tuple of adjacent channels that would be utilized to accommodate the corresponding spread factor.

Figure 5:
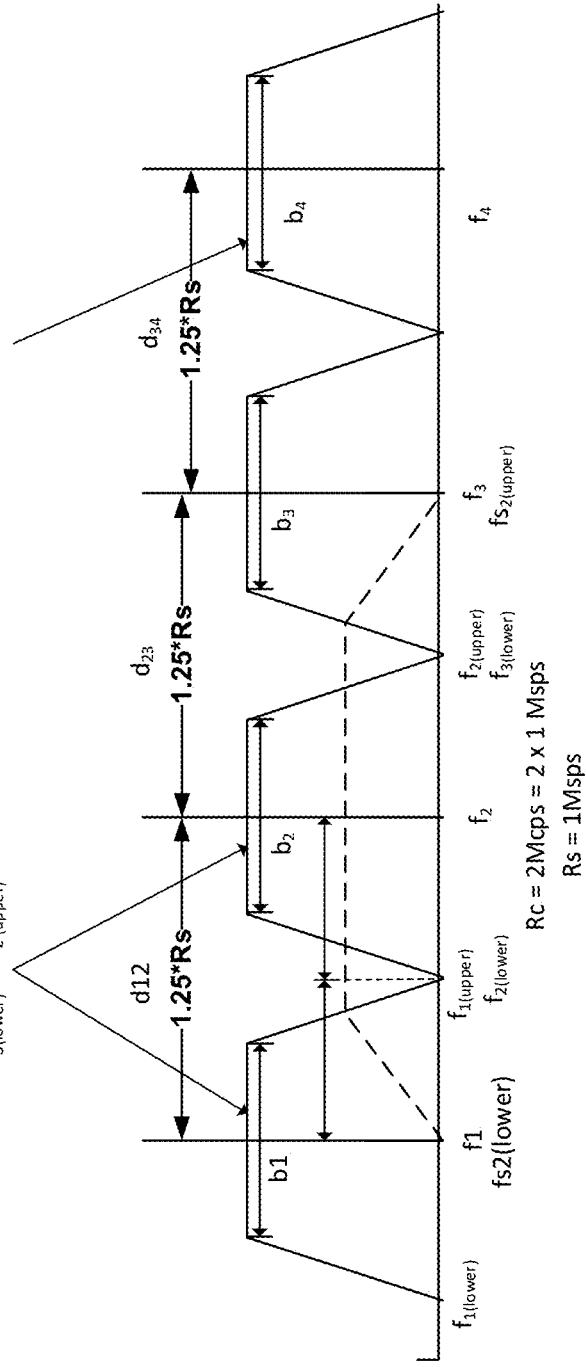
FIG. 5 is a diagram for illustrating detection of adjacent channels, according to various embodiments.

FIG. 5 is a diagram for illustrating detection of adjacent channels that utilize a 1.25× spacing factor, and maximum spread factor supported by the channels. According to an embodiment an algorithm can be implemented by the bandwidth allocator to identify adjacent channels that will be affected based on spread-factor in use while allocating a spread-mode burst in a particular channel. Moreover, adjacent channels need not occupy same bandwidth (i.e., a 1 Msps carrier could be placed besides a 2 Msps carrier, a 512 Ksps carrier, or 4 Msps carrier. Thus, it becomes unnecessary to pack similar bandwidth channels adjacent to each other. The algorithm utilizes the following information as input.

First, is the number of channels being used in the system. There should be a minimum of 3 channels. Otherwise, there is no need to utilize the algorithm because there would be an insufficient number of channels to accommodate any spreading. Let the channels be numbered $C_1, C_2, \ldots, C_n$ with frequencies $F_1, F_2, F_3, \ldots, F_n$, and bandwidth $B_1, B_2, B_3, \ldots B_n$ (in symbol rate) respectively. Assume that $F_1 \geq F_2 \geq F_3 \geq \ldots \geq F_n$.

Second, is the no-spread Spacing (cs) between adjacent channels. According to an exemplary implementation, this is selected to be a multiplication factor of 1.25×.

Third, is a list of spreading factors that need to be supported considering worst case spreading in the network. (×2, ×4, ×8, ×16)

The algorithm subsequently generates an output that consists of a list of tuples corresponding to channels that may be used for spreading with certain spreading factors. Each channel may be associated with one or more spreading factors if available. The tuple also contains adjacent channels if that channel supports spreading. The tuples (T) can be represented as follows:

$$T = \{(C_i, S_j, C_{adj} = \{C_k\}), (\ldots), (\ldots)\}$$

where, i=1, ... n. j=1, 2, 4, 8, 16 (spread factor, 1 implies no spreading).

$C_{adj}$ is adjacent channel list for $C_i$ where k≠i

Note that one channel may support multiple spread modes and the adjacent channel list is populated based on spread mode in use. According to an embodiment, the algorithm can be illustrated as follows:

a. If number of channels is less than 3, quit. (no spreading)
b. If channel is $C_1$ or $C_n$ (first or last channel), set spreading factor ($S_j$) for the channel as 1.
   i.e. $S_1 = 1, S_n = 1$. (first and last channels will always support 1x (or no spreading)
c. For each channel $C_i$ with frequency $F_i$ (i = 2, 3, ..., n − 1)
   For each spread factor $S_j$ (j = 2, 4, 8, 16)
     Find the upper and lower edge based on $S_j$ and spacing Cs
       Upper edge: $E_{upper} = F_i + (½ * B_i * S_j * Cs)$
       Lower edge: $E_{lower} = F_i − (½ * B_i * S_j * Cs)$
       For each channel $C_k$ with frequency $F_k$ where k ≠ i,
         if (k > i) //upper channel
           if $[(F_k − ½ * Bk * Cs) < E_{upper}]$
             add $C_k$ to upper adj list: $Adj_{upper}$
         else if (k < i) //lower channel
           if $[(F_k + ½ * B_k * CS) > E_{lower}]$
             add $C_k$ to lower adj list: $Adj_{lower}$
     Add the tuple $\{C_i, S_j, C_{adj} = \{Adj_{upper} \cup Adj_{lower}\}\}$ to T.
     Where $C_k$ k = 1, 2, ..., n, k ≠ i are the adjacent upper and lower channels populated in the list
d. Output:
   T = { $(C_i, S_j, C_{adj} = \{C_k\})$ , ... }

According to at least one embodiment, the bandwidth allocator can utilize the algorithm to create a list of channels and spreading factors that could be supported for each channel. The list can be created beforehand (e.g., during a system initialization period, after resource reallocation, etc.) by the bandwidth allocator for a given channel configuration. The bandwidth allocator can subsequently broadcast the list to the terminals at regular or irregular intervals. The list is re-evaluated if any channel configuration occurs (such as additional spread modes, new channel addition, deletion or increase in channel bandwidth for some channels), and sent to the terminals notifying the change. When a terminal requires the use of spreading, a bandwidth allocation request is sent to the bandwidth allocator by conventional messaging schemes (e.g., control channels). As previously discussed, the message can include a spread mode being requested by the terminal. The bandwidth allocator may acknowledge or reject the request based on the availability of any channels that could support, for example, the spread factor requested by the terminal. If acknowledged, a message is sent to the terminal indicating the spread mode and frame number from which the spreaded allocations will begin. Once the terminal receives the acknowledgement and starting time of spreaded allocations, it transmits bursts with the acknowledged spread mode. The bandwidth allocator reserves, or skips allocation on, adjacent channels so that ACI can be avoided when bandwidth is allocated using spread-mode. The time plan is then sent to the demodulator which applies the appropriate de-spreading factor for the scheduled bursts to be demodulated.

Figure 6:
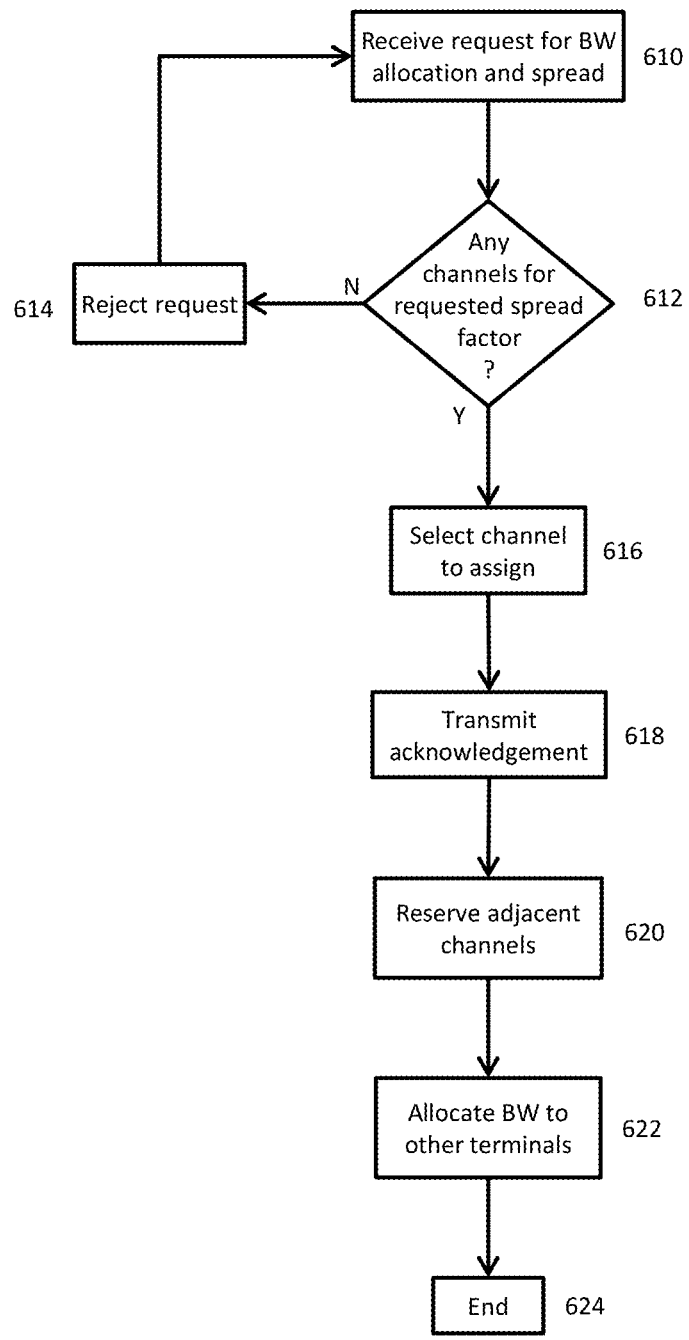
FIG. 6 is a flowchart of a process for allocating bandwidth requests, according to at least one embodiment.

FIG. 6 is a flowchart illustrating a process for allocating bandwidth requests in accordance with at least one embodiment. At 610, a request is received for bandwidth allocation. The request also includes a requested spread factor to be used. The request can be received, for example, from a terminal which requires bandwidth for transmitting data. At 612, it is determined whether any available channels in the frequency band capable of accommodating the requested spread factor. For example, depending on the spread factor, some channels may be capable of accommodating the request, while others may not. If no channels are available for accommodating the requested spread factor, it is rejected at 614. Control returns to 610 where a new bandwidth allocation request can be received from the terminal with a different requested spread factor.

Depending on the particular factors necessitating the initial spread factor request, however, a different spread factor may not be usable by the terminal. For example, the power spectral density requirements may necessitate use of the highest available spread factor. In such cases, the terminal may resubmit the same bandwidth allocation request and spread factor request. If channels are available to accommodate the requested spread factor, control passes to 616. A channel is selected and assigned to the terminal for transmitting the next burst. At 618, an acknowledgment is transmitted to the terminal to indicate that the requested spread factor can be accommodated, together with relevant information such as start of allocation with that spread factor. According to one or more embodiments, the channel assignment can also be included in the acknowledgment transmitted to the terminal.

Figure 7:
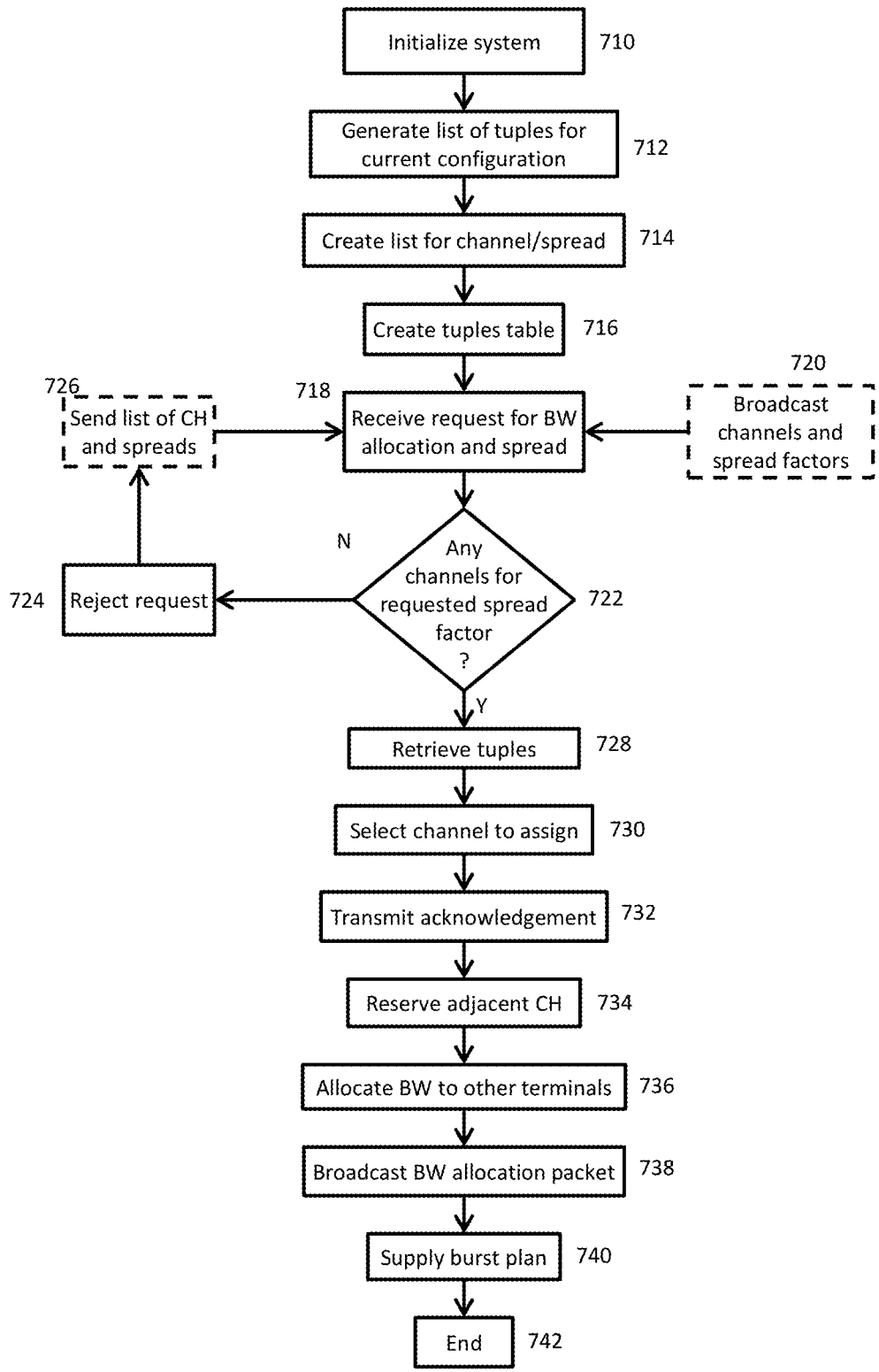
FIG. 7 is a flowchart of a process for allocating bandwidth requests, according to various embodiments.

At 620, adjacent channels are reserved based on the requested spread factor for the burst/slot number required to accommodate the transmission. As previously discussed, the slots on reserved adjacent channels (see FIG. 3, slot 1) would not be available for bandwidth allocation for other terminals during the specified burst duration or slot. However, such slots on adjacent channels may become available during the next or subsequent burst in the TDMA frame. At 622, bandwidth is allocated to all the terminals based on available slots on each channel. This can correspond, for example, to the bandwidth allocator reserving (i.e. not allocating) one or more slots on adjacent channels of the assigned channel in order to achieve the necessary spread factor. The process ends at 624 after allocating bandwidth for spreaded and non-spreaded channels FIG. 7 is a flowchart illustrating a process for allocating bandwidth and spread factors, in accordance with various embodiments. At 710, the system is initialized. According to an embodiment, this can include information about the system's current configuration being supplied to, or retrieved by, the bandwidth allocator. This information can include a list of channels and their associated bandwidth. Depending on the specific system implementation, the channel bandwidths can be equal to each other or different. At 712, the bandwidth allocator utilizes the received information to generate a list of tuples for the current channel configuration. This can be done, for example, by generating a spread factor table (see FIG. 4) when the channel bandwidths are equal and/or using the previously described algorithm to determine information pertaining to each channel as well as the tuples of adjacent channels that would need to be reserved for different spread factors. More particularly, the previously described algorithm can be used to determine the adjacent channel list for each channel in the system. The size of each channel can be determined by the bandwidth allocator within the frequency spectrum.

According to at least one embodiment, the bandwidth allocator can be configured to dynamically determine the size of individual channels in the system after a predetermined number of requests have been received or at periodic or aperiodic intervals. This can be done, for example, in systems that implement frequent or dynamic reallocation of inroutes. Since such reallocation can reconfigure channel size and symbol rates, the maximum amount of spreading supported by each channel can change with each reallocation. Thus, the bandwidth allocator can utilize a spread factor table for systems with equal channel size, determine channel size and supported spread factors for during initialization (or after infrequent changes) for systems with different channel sizes, or dynamically determine channel size and supported spread factors for systems that implement frequent changes.

At 714, a list is created to identify all channels in the system as well as the spread factors achievable from each channel. According to an embodiment, the list can simply specify the maximum spread factor supported by each channel. At 716, a tuples table is created. The tuples table can include, for example, the tuples of adjacent channels for each spread factor supported by individual channels in the system. According to one or more embodiments, the channel/spread list and tuples table can be simultaneously generated and/or combined into a single table containing all the necessary information regarding spread factors supported by each channel and tuples of adjacent channels for each supported spread factor.

At 718, a request is received for bandwidth allocation with a particular spread factor. The request can be received, for example, from a terminal which has data that must be transmitted. According to at least one embodiment, the available channels and spread factors that can be supported can be periodically broadcast to all terminals in the system. For example, the bandwidth allocator can periodically broadcast this information at regular or irregular intervals so that terminals can avoid transmitting request that cannot be accommodated. This is illustrated at 720. Accordingly, prior to transmitting a bandwidth allocation request, the terminal would examine this information and attempt to select a spread factor that may be available on the current TDMA frame.

At 722, it is determined whether any of the available channels are capable of accommodating the requested spread factor. If there aren't any channels available to accommodate the requested spread factor, then the request is rejected at 724. According to at least one embodiment, a list of available channels and spread factors can optionally be transmitted to the terminal, at 726, if the bandwidth allocation request is rejected. Control then passes to 718, where the terminal can submit a new request. If a list of available channels and spread factors was received by the terminal, then the new request would contain a spread factor from the list received. For example, the terminal could submit a new request that utilizes a different symbol rate and spread factor in order to achieve the necessary power levels.

If a channel capable of accommodating the requested spread factor is found, control passes to 728, where the list of tuples corresponding to the requested spread factor is retrieved. Depending on the manner in which the tuples are stored, this can involve examining of a lookup table, or querying a database. At 730 a channel is selected and assigned to the terminal for transmitting the next burst. According to at least one embodiment, multiple bursts can be assigned to the terminal depending on the amount of data that must be transmitted. At 732, an acknowledgment request is transmitted, for example, to the terminal. At 734, adjacent channels are reserved. The adjacent channels can correspond, for example, to channels contained in the tuples obtained by the bandwidth allocator, or the retrieved tuples table.

According to at least one embodiment, if a terminal submits a request that is rejected, the bandwidth allocator can optionally allocate bandwidth without any spreading. This can be done, for example, if the spread factor is being requested for reasons that may be unrelated to regulatory power requirements. This can include certain optimization techniques or use of LEO/MEO systems where line of sight of a fixed terminal keeps changing from one satellite to another satellite. More particularly, spreading could be used as a technique to avoid interference from one satellite beam (current line of sight) to the adjacent satellite that is approaching in line of sight. Under such conditions, the bandwidth allocator can be configured to reject the request for spreading, while allocating normal (no-spread) bandwidth to the terminal.

At 736, bandwidth is allocated to other terminals. At 738, a bandwidth allocation packet is broadcast to the terminals. The bandwidth allocation packet can include information such as channel number, terminal identification, frame number, burst size, spread factor, etc. At 740, a burst plan is supplied, for example, to the demodulator. According to an embodiment, the burst plan can include information such as channel number burst size burst duration, spread mode, etc. The information contained in the burst plan can be used by the demodulator in order to properly de-spread and demodulator burst that are received at the gateway from the terminals. The process ends at 742.

According to the disclosed features, channels can be dynamically separated based on spreading factor needed for a particular burst allocation, thereby allowing better usage of frequency spectrum particularly when spreading is required on demand. ACI is also avoided by separating the channels on a burst by burst basis in time, based on the spreading factor of the burst allocation. Additionally, overall spectral efficiency is improved if the network has mixed requests for bandwidth allocation (spread, non-spread terminals) as more bandwidth is available for distribution, compared with conventional static separation of the channels. Furthermore, leverage can be provided to use spreading across any channels based on their relative position. For example, the edge channels can support only 1× (or no spreading), while the center channel may support 2×, 4×, 8×, 16×, etc. spreading based on number of channels and bandwidth. There is no need to configure channels for specific spreading-factor. Based on maximum (or worst case) factor, the bandwidth allocator will separate the channels in near real time as per requirement. Even if adjacent channels do not have the same bandwidth (symbol rate), the spreaded burst does not roll over into adjacent channel's spectrum.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described bandwidth allocator, demodulator, receivers, transmitters, transceivers, terminal, gateway, etc. Additionally, such hardware can be interfaced to connect and/or facilitate communication between different components such as the bandwidth allocator and demodulator. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
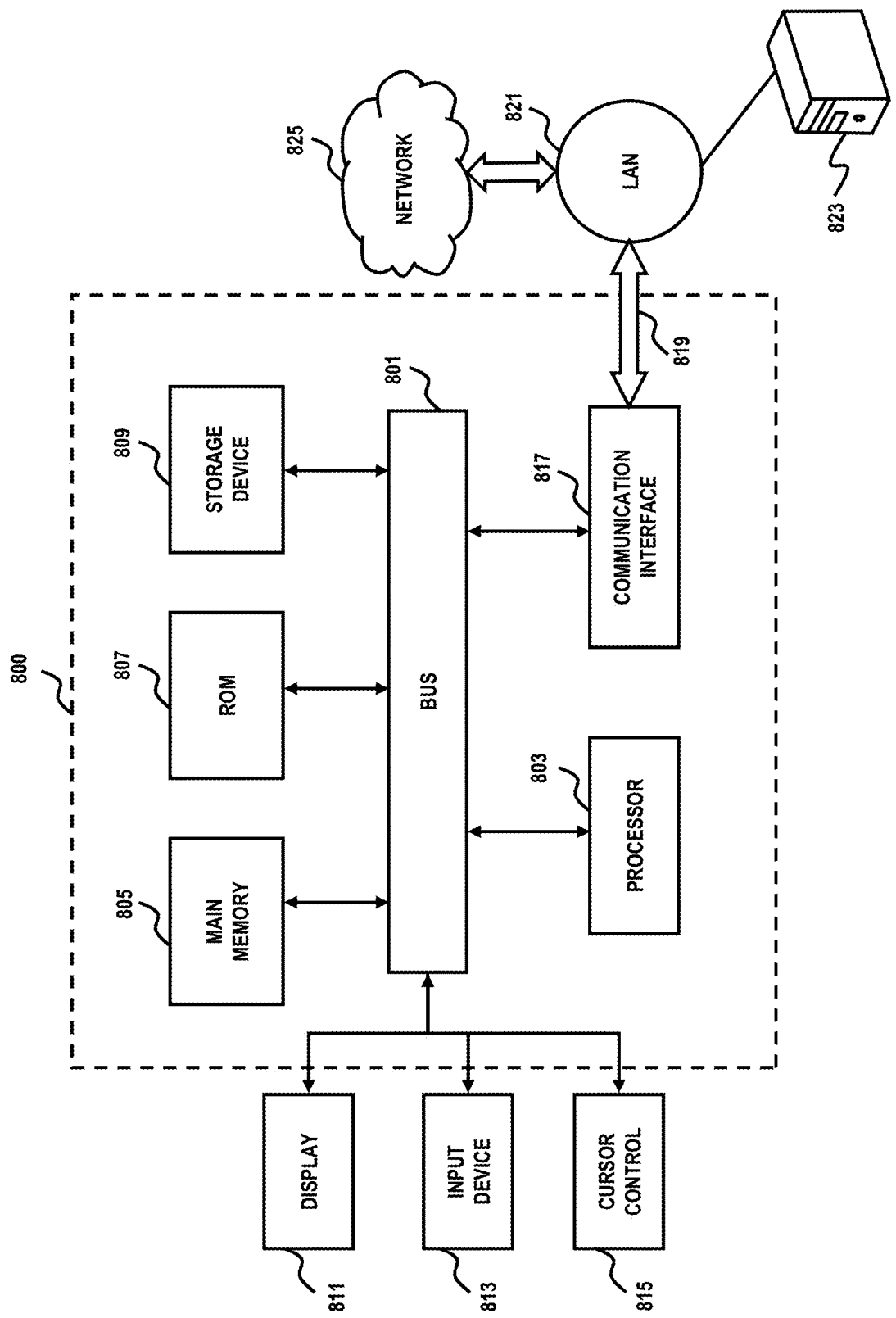
FIG. 8 is a diagram of a computer system that can be used to implement various exemplary features and embodiments.

FIG. 8 is a diagram of a computer system that can be used to implement features of various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
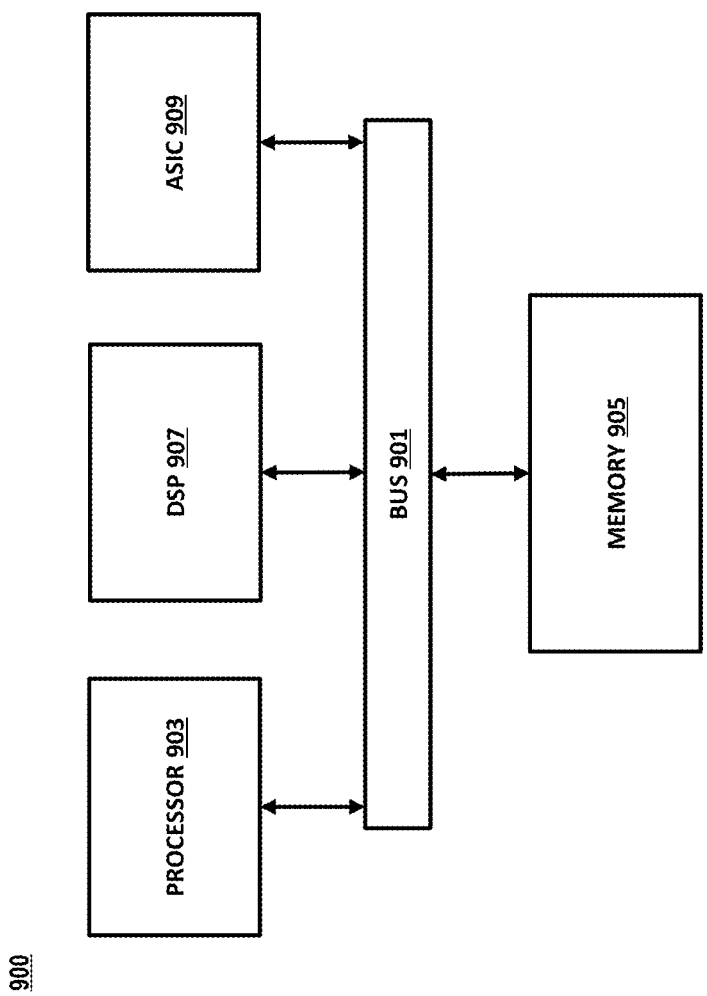
FIG. 9 is a diagram of a chip set that can be used to implement various exemplary features and embodiments.

FIG. 9 illustrates a chip set 900 upon which features of various embodiments may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   determining a list of tuples corresponding to channels above and below a selected channel that are usable for applying spread factors to the selected channel;
   receiving a request, from a terminal, for bandwidth allocation using a requested spread factor;
   determining if any channels are currently capable of supporting the requested spread factor;
   rejecting the request if no channels are currently capable of supporting the requested spread factor;
   generating an acknowledgement and transmitting the acknowledgment to the terminal if at least one channel is capable of supporting the request;
   reserving two or more channels adjacent to the selected channel from the at least one channel based, at least in part, on the requested spread factor; and
   allocating bandwidth for data received from other terminals on non-reserved channels.

2. The method of claim 1, wherein the request is rejected, and further comprising receiving a new request for bandwidth allocation from the terminal using a new requested spread factor.

3. The method of claim 1, further comprising:
transmitting a list of available spread factors to the terminal, if the request is rejected; and
receiving a new request for bandwidth allocation from the terminal using a spread factor selected from the list of available spread factors.

4. The method of claim 1, further comprising broadcasting a list of channels capable of supporting spreading together with spread factors supported by each channel.

5. The method of claim 1, further comprising broadcasting a bandwidth allocation packet to all terminals, the bandwidth allocation packet containing information pertaining to at least one burst received from each terminal on a current TDMA frame.

6. The method of claim 1, further comprising supplying a burst plan to a demodulator for demodulating a current TDMA frame containing data from each terminal, the burst plan including at least a spread factor used for each channel.

7. The method of claim 1, wherein supported spread factors are determined based, at least in part, on a channel location within a frequency band.

8. The method of claim 1, wherein all channels have a common bandwidth size.

9. The method of claim 1, wherein receiving a request further comprises:
identifying a bandwidth size for each channel, wherein the bandwidth size for each channel is independently set, and at least two channels have bandwidth sizes that are different from each other.

10. An apparatus comprising: a transceiver for transmitting and receiving information; and one or more processors configured to: determine a list of tuples corresponding to channels above and below a selected channel that are usable for applying spread factors to the selected channel;
receive a request, from a terminal, for bandwidth allocation using a requested spread factor; determine if any channels are currently capable of supporting the requested spread factor; reject the request if no channels are currently capable of supporting the requested spread factor; generate an acknowledgement and control the apparatus to transmit the acknowledgment to the terminal if at least one channel is capable of supporting the request; reserve two or more channels adjacent to the selected channel from the at least one channel based, at least in part, on the requested spread factor; and allocate bandwidth for data received from other terminals on non-reserved channels.

11. The apparatus of claim 10, wherein the request is rejected, and the one or more processors are further configured to receive a new request for bandwidth allocation from the terminal using a new requested spread factor.

12. The apparatus of claim 10, wherein the one or more processors are further configured to:
generate a list of available spread factors for transmission to the terminal, if the request is rejected; and
receive a new request for bandwidth allocation from the terminal using a spread factor selected from the list of available spread factors.

13. The apparatus of claim 10, wherein the one or more processors are further configured to generate a list of channels for broadcast, the list specifying channels capable of supporting spreading together with spread factors supported by each channel.

14. The apparatus of claim 10, wherein the one or more processors are further configured to generate a bandwidth allocation packet for broadcast to all terminals, the bandwidth allocation packet containing information pertaining to at least one burst received from each terminal on a current TDMA frame.

15. The apparatus of claim 10, wherein the one or more processors are further configured to generate a burst plan for demodulating a current TDMA frame containing data from each terminal, the burst plan including at least a spread factor used for each channel.

16. The apparatus of claim 10, wherein supported spread factors are determined based, at least in part, on a channel location within a frequency band.

17. The apparatus of claim 10, wherein all channels have a common bandwidth size.

18. The apparatus of claim 10, wherein the one or more processors are further configured to:
identify a bandwidth size for each channel, wherein the bandwidth size for each channel is independently set, and at least two channels have bandwidth sizes that are different from each other.

* * * * *